US 6,695,286 B1

(12) United States Patent
Florio et al.

(10) Patent No.: US 6,695,286 B1
(45) Date of Patent: Feb. 24, 2004

(54) VALVE WITH BALL OF CONTROLLED DEFORMATION

(75) Inventors: Andrea Florio, Palo Del Colle-Bari (IT); Fabio Bucci, Foggia (IT)

(73) Assignee: Nuovo Pignone Holding, S.p.A., Florence (IT)

(*) Notice: Subject to any disclaimer, the term of this patent is extended or adjusted under 35 U.S.C. 154(b) by 12 days.

(21) Appl. No.: 09/555,910

(22) PCT Filed: Aug. 30, 1999

(86) PCT No.: PCT/IB99/01490
§ 371 (c)(1),
(2), (4) Date: Jul. 18, 2000

(87) PCT Pub. No.: WO00/20783
PCT Pub. Date: Apr. 13, 2000

(30) Foreign Application Priority Data

Oct. 7, 1998 (IT) .......................... MI98A2157

(51) Int. Cl.[7] .............................. F16K 5/06; F16K 15/00
(52) U.S. Cl. ................................ 251/315.16; 251/334
(58) Field of Search .................. 251/175, 192, 251/180, 315.01, 315.16, 334

(56) References Cited

U.S. PATENT DOCUMENTS 3,130,952 A    4/1964   Meyer
3,348,805 A  * 10/1967   Sanctuary

FOREIGN PATENT DOCUMENTS

GB       457 279      11/1936
GB     2 156 496      10/1985
NL       128 847      12/1969

* cited by examiner

Primary Examiner—Kevin Shaver
Assistant Examiner—David A Bonderer
(74) Attorney, Agent, or Firm—Nixon & Vanderhye

(57) ABSTRACT

A valve with ball of controlled deformation for fluid shut-off comprising an external containment body (11), inside which is arranged a shutter element (13), movable between a closure position and an opening position of the valve, the shutter element cooperating with one or more seats (12) and providing for seal elements with respect to the containment body and to the shutter element, in which the shutter element provides for yielding zones (15a) in its spherical portions (15) disposed downstream of the seats with respect to a pressure zone. Preferably the yielding zones are provided by notches (19) produced on surface zones of the shutter elements in correspondence with the spherical portions.

8 Claims, 5 Drawing Sheets

VALVE WITH BALL OF CONTROLLED DEFORMATION

The present invention relates to a valve with ball of controlled deformation.

Ball valves are fluid shut-off devices which are widely used in all types of processes and all branches of engineering. These ball valves are used, for example, in water, oil, gas transport systems, in hydrocarbon production plants, in chemical, petrochemical plants and in electrical energy generating equipment.

It should also be noted that ball valves are available and may be used in a wide range of sizes, from the smallest to those which exceed 60 for pressures up to hundreds of bars.

In such shut-off devices, i.e. ball valves, the fluid seal is effected between the ball and the two seats, each of which is equipped with a circular insert of deformable material which is clamped between the two metal surfaces.

The function of the inserts is to compensate, by their own deformations, for the elastic deformations, the small geometrical errors and the roughnesses which are always present on the surface of the ball.

In general, the force required to flatten the insert, and hence to produce the seal, is supplied, as shown in FIG. 1 relating to a ball valve of the prior art, to a modest extent by a system of springs (Fm) and to the greatest extent by the pressure exerted by the said fluid on the seat (Fs).

The inserts are normally made of elastomeric (nitrite, viton etc.) or thermoplastic (PTFE, nylon etc.) material which can ensure optimum performance (i.e. high levels of sealing) as long as the operating conditions do not become particularly onerous.

Examples of such onerous and limit conditions are those which may be caused by the presence of particularly "dirty" fluids which entrain abrasive particulates. A further example of onerous conditions is one in which the valve is required to operate for a prolonged period in the partially open condition, with the fluid which, flowing at high velocity, violently laps the insert or conditions in which high temperatures are present.

In these cases in which the use of elastomeric or thermoplastic inserts becomes critical and an adequate durability of the system cannot be guaranteed over time, use is made of completely metallic seal elements.

The metal surfaces of the seats and of the ball, which are to provide the seal and on which the reciprocal sliding takes place, are hardened for this purpose, by heat-treating the base materials. Alternatively these surfaces may be provided with hard superficial facings obtained by welding or other more advanced technologies (plasma, HVOF etc.).

In this type of valve, in which the contribution towards obtaining a good seal which is made by the elastic deformation of the insert is lacking, it is necessary to have recourse to extremely accurate machining of the surfaces of the seats and of the ball, which come into contact with each other, so as to minimize any geometrical errors and surface roughnesses which are present.

Again from a reference to FIG. 1, it is possible to see that when the ball valve is closed and subject to pressure (p), the ball deforms in a non-uniform manner because its geometry is not axially symmetrical. In fact the force lines due to its state of stress pass through the ball from the cap (a) on which the pressure acts, in correspondence with the supports of the two hubs (b), and the points of the ball belonging to the contact circumference with the seat (d) shift in non-uniform manner from (d) to the curve (e), while the external surface of the ball assumes the shape (g) and the passage hole of the fluid the shape (f), both denoted by dotted lines in FIG. 1.

An observation of the behavior of the valve in this condition subject to pressure enables one to note that the ball is much more rigid in the two zones, top and bottom, closest to the hubs (b) with respect to the central zone which is rendered more elastic by the passage hole of the fluid of diameter 0.0.

This deformation of the ball is obviously greater, the higher the working pressure (p).

But the more the deformation of the contact circumference from (d) to (e) differs from point to point, the more problematical the possibility of keeping the metallic contact between ring-seat and ball, or rather a seat/ball contact pressure, as uniform as possible so as to guarantee good sealing conditions over the 360°.

Attempts are normally made to obviate this phenomenon by stiffening the ball, i.e. with the same passage dimension (diameter $\Phi_0$), increasing the external diameter thereof (diameter $\Phi_1$) All this does, however, involve greater size, weight and cost of the valve with very modest benefits as regards its structure and operation.

Further attempts have been made to improve the operation of ball valves in various ways. An attempt is made to limit the drawback by, for example, making the seats more deformable, in a manner compatible with their state of stress, i.e. capable of Following the deformations of the ball in improved manner under the thrust of the springs (Fm) and the pressure (Fs), as shown in FIG. 2, an embodiment of the prior art.

In this case also, however, calculations and parallel experiments show that these interventions make modest contributions towards a genuine resolution of the problem.

The object of the invention is therefore to provide a ball valve in which it is possible to obtain a very tight seal even when the ball valve is subjected to particularly high pressure.

A further object of the invention is to provide a ball valve which, while remaining very simple in structure and of modest cost, fully meets the operating and sealing performances which are necessary and required.

These and further objects according to the invention are achieved by producing a valve with ball of controlled deformation for fluid shut-off comprising an external containment body, inside which is arranged a shutter element, movable between a closure position and an opening position of the valve, the shutter element cooperating with one or more seats and providing for seal elements with respect to the containment body and to the shutter element, characterized in that the said shutter element provides for yielding zones in its spherical portions disposed downstream of the said seats with respect to a pressure zone.

Furthermore the valve provides that the said yielding zones are provided by notches produced on surface zones of the said shutter element in correspondence with the said spherical portions.

Preferably the said notches are substantially produced according to a direction parallel to an axis of rotation of the said shutter element.

The characteristics and advantages of a valve with ball of controlled deformation according to the invention will emerge more clearly from the description below, which is given by way of non-exhaustive example, with reference to the accompanying diagrammatic drawings in which:

DETAILED DESCRIPTION OF THE DRAWINGS

Figure 1:
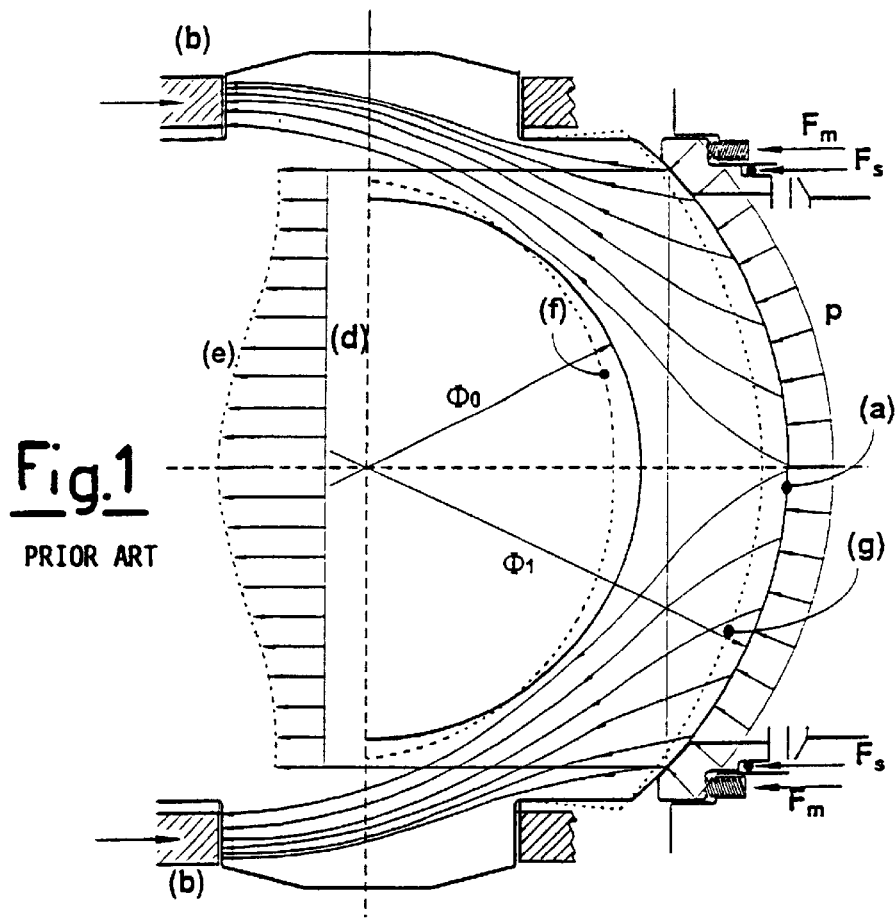
FIG. 1 is a partial view of a valve with ball according to the prior art, partly a view, partly a sectional view, in which the stresses are shown, and the deformation of the parts in dotted lines.
Figure 2:
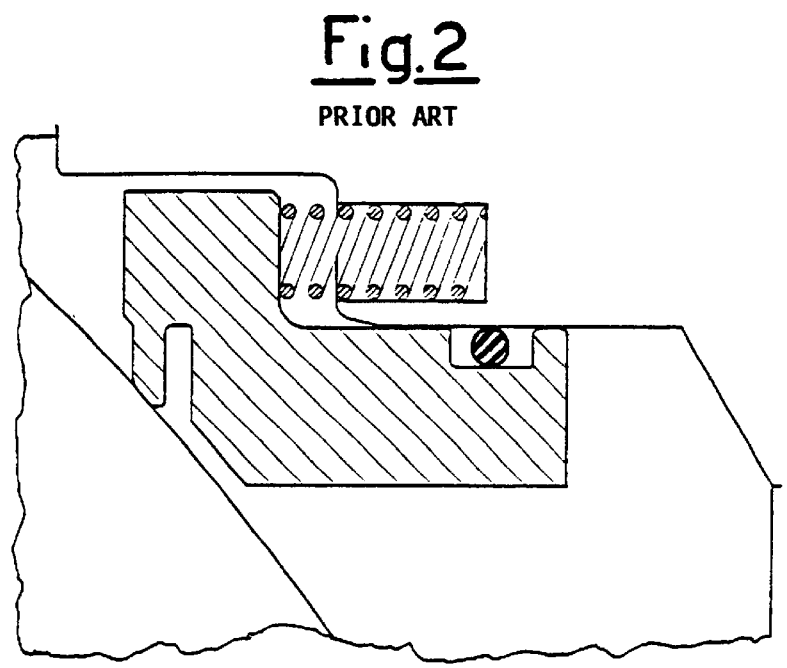
FIG. 2 is a view of an enlarged detail of FIG. 1.
Figure 3:
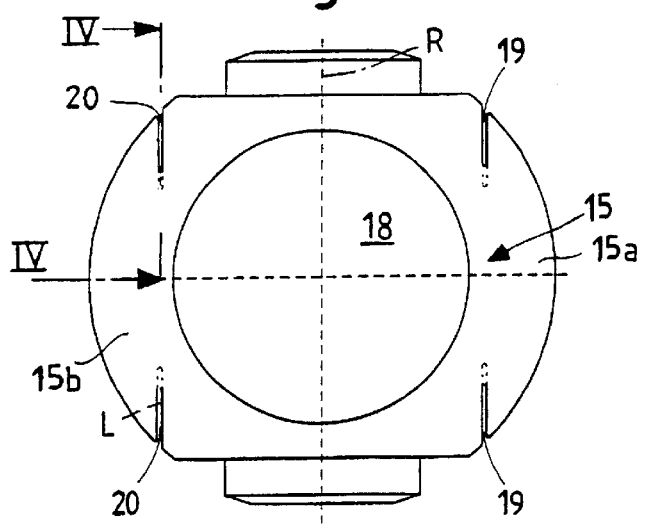
FIG. 3 shows a lateral elevation on a smaller scale of a shutter element according to the invention in a first embodiment thereof.
Figure 4:
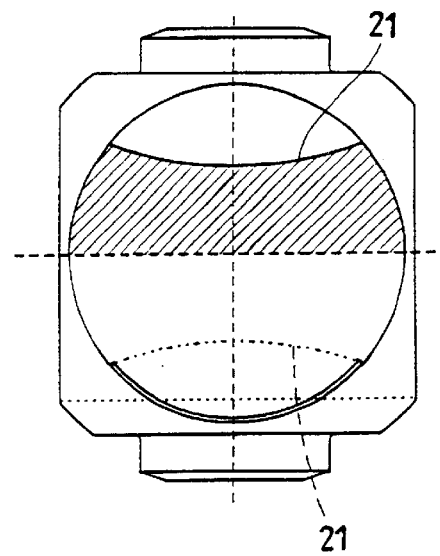
FIG. 4 is a view, half of which is sectional according to IV—IV of FIG. 3 and half a side view.

With reference to FIGS. 3 to 14, a valve with ball of controlled deformation is shown in a series of exemplary embodiments in which the shutter element varies.

As stated, FIGS. 3–6 show a first embodiment of a valve with ball of controlled deformation according to the invention which primarily comprises an external containment body, shown as 11, on which a pair of ring seats 12 disposed on opposite sides is placed. These ring seats 12 are in fact positioned on opposite sides towards an inlet pipe and respectively an outlet pipe of the fluid which passes into the valve and/or is shut off by it.

The valve further receives a shutter element, denoted overall by 13, which is rotatable by means of a control shaft, not shown, which may be connected to appendices 14 disposed perpendicular to the above-mentioned pipes.

As can be seen, the shutter element 13 is of the ball type and is movable between a closure position and an opening position of the ball valve. Viewed with respect to the appendices 14, on opposite sides the lateral surface of the ball may provide spherical portions 15 suitable for engaging on surfaces 16 of the two ring seats 12. The further two opposite parts are flat and apertures 17 which connect a central hole 18 for the passage of the fluid are produced on them.

The ring seats 12 may of course be shaped in different ways so as to adapt to the particular positioning and they may provide for the positioning of suitable seal elements which are not shown.

According to the invention it will be noted that notches 19 and 20 are produced on opposite sides, at the top and the bottom, between the spherical portions 15 and the central zone of the body of the shutter element so as to provide a kind of capped portions 15a and 15b. These notches 19 and 20 penetrate for a certain variable length L inside the spherical portions in a direction parallel to an axis R of rotation of the shutter element. These notches 19 and 20 are produced in zones in proximity to the appendices 14.

The presence of the notches 19 and 20 producing the two caps 15a and 15b provide a certain uniformity of deformation of the ball shutter element, particularly in the entire contact zone with the ring seats 12. This situation can be clearly seen in FIG. 6.

It is, of course, possible to optimize the profile of the notch 19 and 20 so as to minimize the differences of deformation of the ball shutter element along all the 360°.

Figure 5:
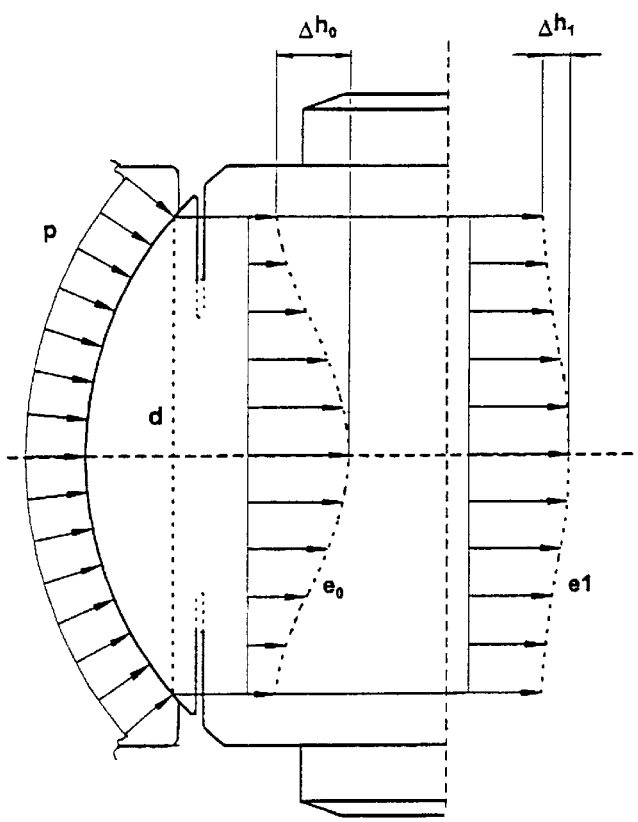
FIG. 5 is a view of part of a shutter element of a valve with ball according to the invention of FIG. 3, showing stresses and deformations of the parts.

FIG. 5, which shows half of the shutter element 13 produced according to the invention in its first embodiment, further shows how the stresses act and how the parts deform, in a theoretical line.

In fact FIG. 5 shows the curve $(e_0)$ which qualitatively shows how the circumference of theoretical contact deforms axially between the spherical portion of a known shutter element and the ring seat 12, denoted here by (d). From the drawing it can be seen that the maximum difference of the axial movements due to stresses is denoted by $\Delta h_0$.

In contrast the curve $(e_1)$ shows the axial deformation of (d) when the geometry of the shutter element in its capped portion is modified according to the invention by the production of the notches 19 and 20.

It is thus possible to note how the maximum difference of the axial movements on the theoretical contact circumference (d) is $\Delta h_1$, which is much less than $\Delta h_0$.

It can thus be seen how it is possible to have a better adaptation of a shutter element produced according to the invention.

In fact, according to the invention, the spherical part of the shutter element is modified by increasing the deformability in the two zones, upper and lower, close to the appendices or hubs 14. This solution is completely opposite to that of the traditional structure in which it is the presence of the hubs which affords greater rigidity to these zones with respect to the central ones.

In the example shown in FIGS. 3–6, the notch 19 and 20 has a base 21 of curvilinear shape.

It is, however, possible to use a series of different shapes of the base of the notch or to extend the notch to the entire spherical portion 15.

Figure 7:
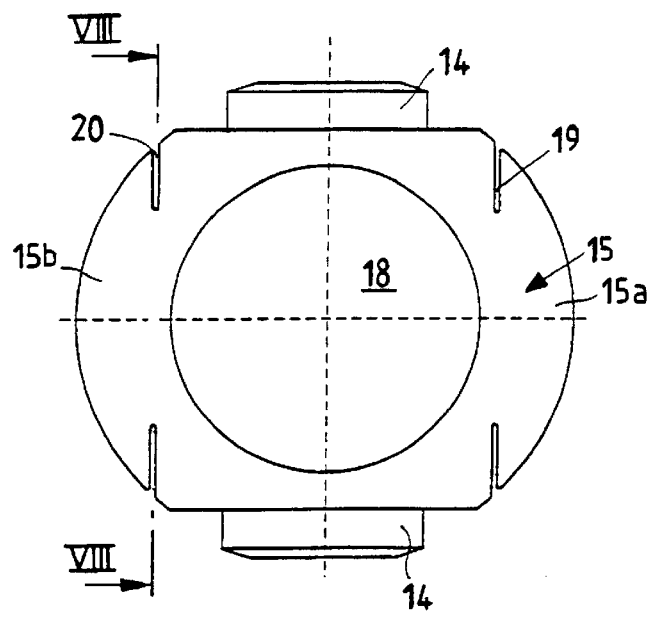
FIG. 7 is a lateral elevation on a smaller scale of a shutter element according to the invention, in a second embodiment thereof.
Figure 8:
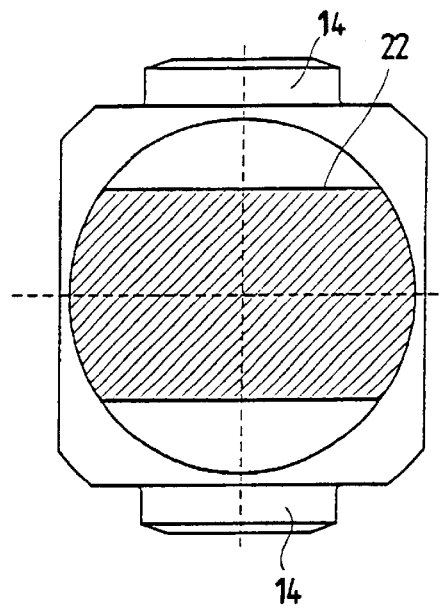
FIG. 8 is a sectional view according to VIII—VIII of FIG. 7.

It will thus be noted how FIGS. 7 and 8 show notches 19 and 20 which have a base 22 of rectilinear shape.

Figure 9:
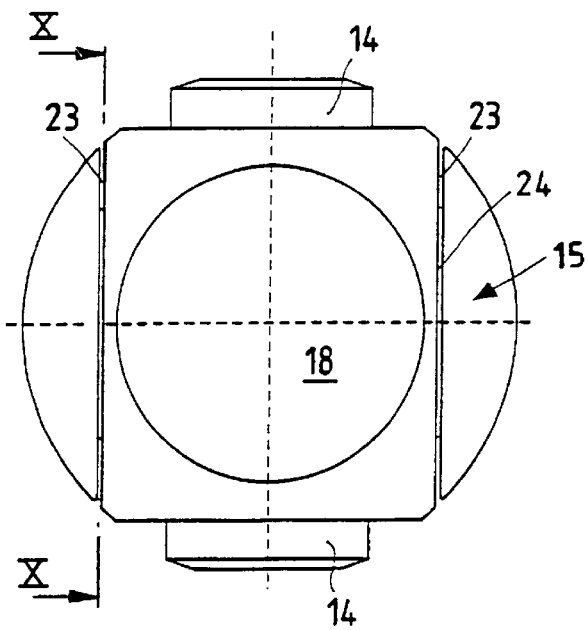
FIG. 9 is a lateral elevation on a smaller scale of a shutter element according to the invention in a third embodiment thereof.
Figure 10:
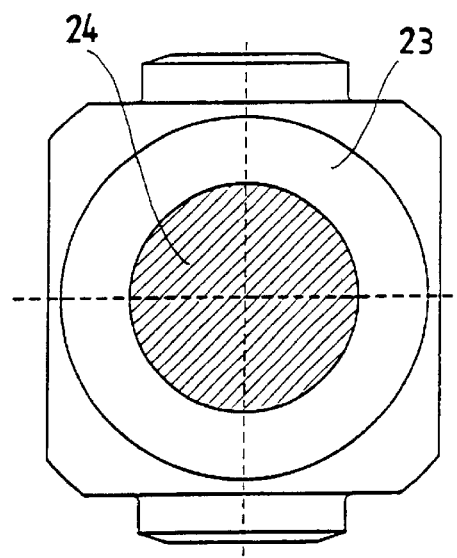
FIG. 10 is a sectional view according to X—X of FIG. 9.

FIGS. 9 and 10 show a third embodiment of shutter element, according to the invention in which the opposing notches are Joined together to produce a circular notch 23. The spherical caps which derive therefrom are thus suspended on a circular central portion of smaller diameter 24, in the manner of a mushroom.

Figure 11:
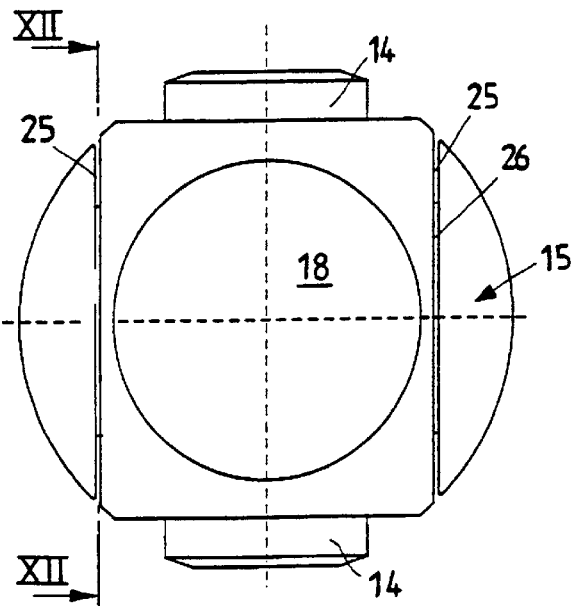
FIG. 11 is a lateral elevation on a smaller scale of a shutter element according to the invention in a fourth embodiment thereof.
Figure 12:
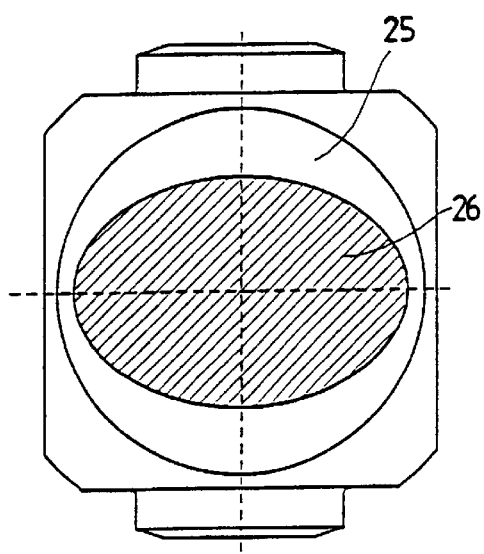
FIG. 12 is a sectional view according to XI—XI of FIG. 11.

FIGS. 11 and 12 show a fourth embodiment of shutter element according to the invention in which, as in the preceding embodiment, a notch 25 is produced along the entire spherical portion 15.

This notch 25 is variable in depth so that the spherical caps which derive therefrom are suspended on a central portion of smaller dimension 26, shaped like an ellipse and having the larger axis directed perpendicular to the axis of rotation R of the shutter element 13.

Figure 13:
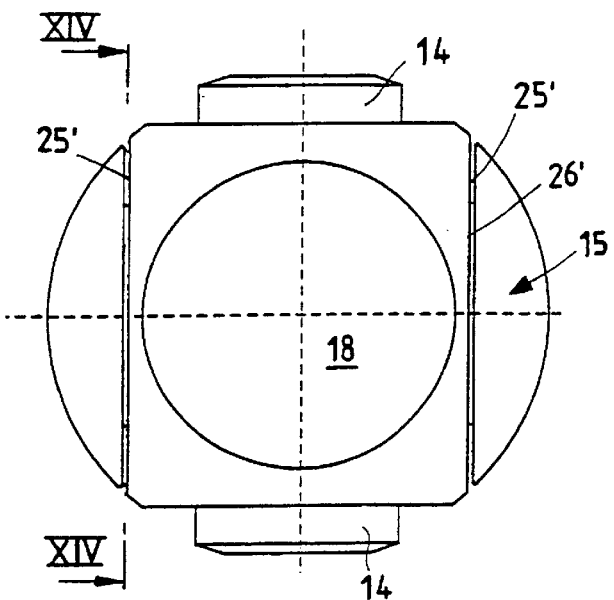
FIG. 13 is a lateral elevation on a smaller scale of a shutter element according to the invention in a fifth embodiment thereof.
Figure 14:
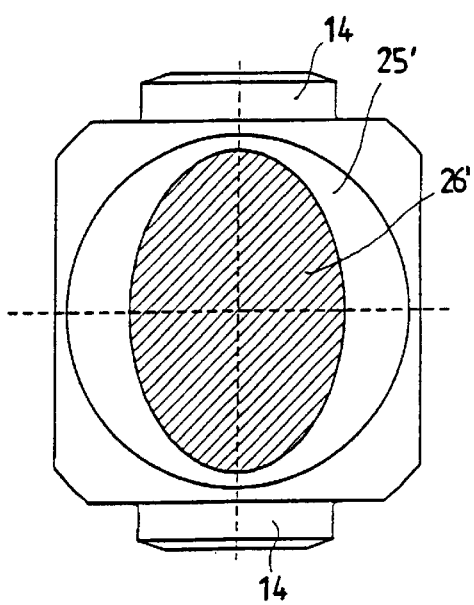
FIG. 14 is a sectional view according to XIV—XIV of FIG. 13.

Finally the same considerations of FIGS. 11 and 12 may be repeated for FIGS. 13 and 14 in which a fifth embodiment differs in that the central portion 26' is also elliptical but rotated through 90° with respect to the preceding one.

A peripheral notch may also be produced according to a different profile so as to provide a central portion of smaller dimension which is differently shaped.

A ball valve according to the invention therefore offers a valid solution to the technical problems raised by the shutter elements of the prior art. In fact, the presence of notches in the spherical portions causes these zones to even out the elastic deformations, under pressure, when brought into contact with the respective seats.

Figure 6:
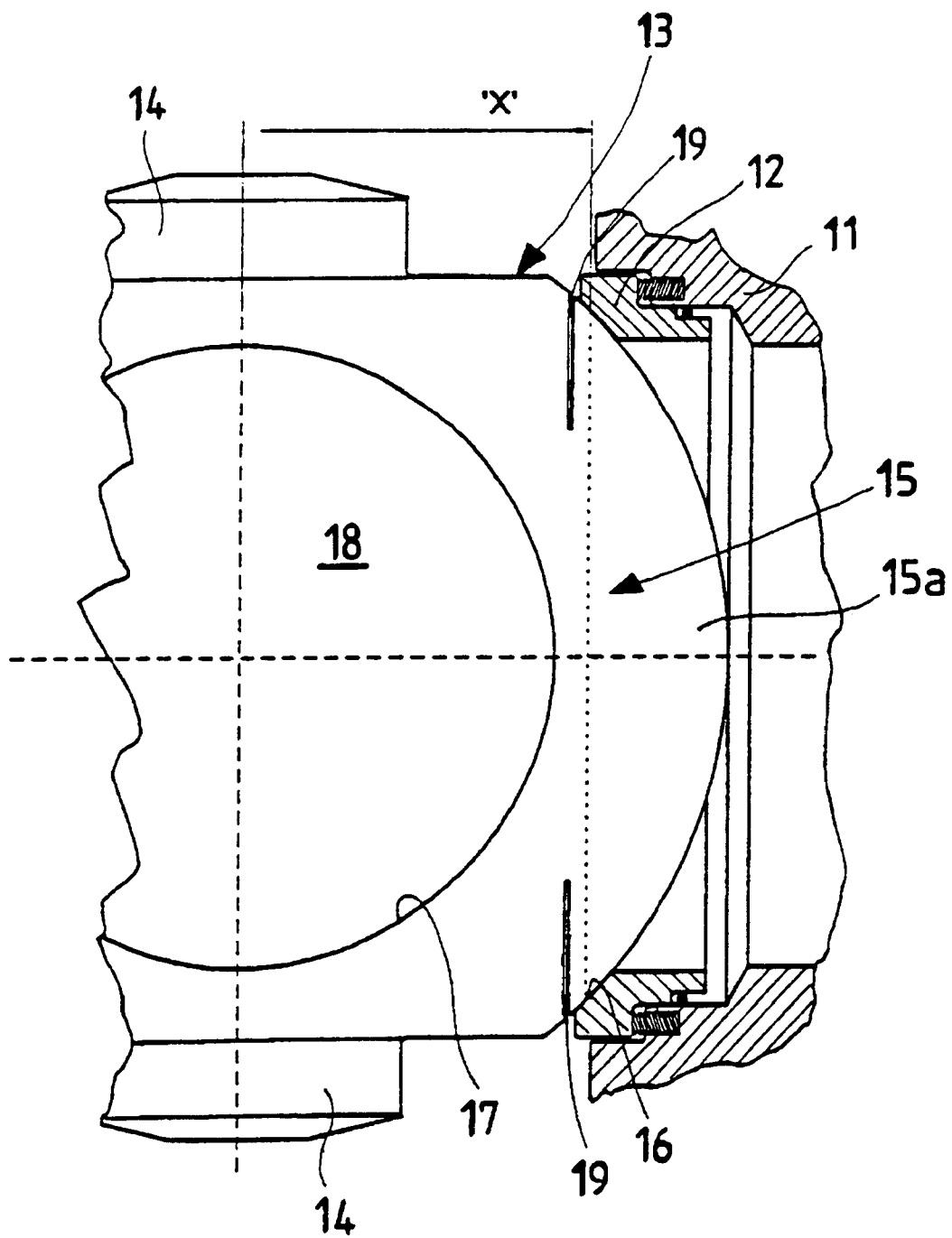
FIG. 6 is a further, partial view of the shutter element of FIG. 3, partially mounted.

It should be noted that the notches, as shown in FIG. 6, should be produced downstream of the seat 12 or downstream of the pressurized zone, in a zone denoted by X.

Furthermore it has been seen that the notch or relieving may have different types of geometries, as a function of the dimensions of the spherical portions and as a function of working pressure levels or other specific parameters.

The possibility of evening out the deformations of the shutter element in the spherical portions thus enables the operation of ball valves to be improved. And this takes place both when elastomeric or thermoplastic inserts are used on the seat and when metal seals are used, at both low and high pressure.

A technical solution such as that of the invention may therefore be applied to any type of ball valve.

The technical solution of the invention thus enables a greater uniformity of the deformation of the ball to be achieved by virtue of the statements already made above.

It may therefore be believed that it enables the same level of sealing to be obtained as with a conventional ball valve, but in the presence of a much higher pressure $$P_1 = P_0 \cdot \frac{\Delta h_0}{\Delta h_1} \; P_1 \gg P_0$$

It therefore follows that with the same obtainable level of sealing, it is possible to apply less force to the seat. In fact, the seat has to deform less to follow the deformations of the ball which are much more contained. This situation consequently makes it possible to be able to operate the valves or the shutter elements with lower operating torques.

It should also be noted that the special geometry of the shutter element in its spherical portions may be produced of metallic material, on the basis of a body which has been cast, forged, rolled or assembled by welding or directly of suitably selected plastics or composite materials.

What is claimed is:

1. A ball valve for a fluid shutoff comprising:

an external containment body having an inlet for receiving fluid under pressure and an outlet;

a shutter element within said containment body having a spherical portion and movable between a closure position between said inlet and said outlet with said spherical portion facing upstream toward the inlet and an opening position of the valve enabling fluid flow from the inlet to the outlet;

at least one seat within the containment body and cooperable with the shutter element in the closure position thereof providing a seal between the containment body and the shutter element;

said shutter element having yielding zones in the spherical portion disposed downstream of said seat with respect to a pressure zone along a face of the shutter element exposed to the fluid in the inlet in the closure position of the shutter element, said yielding zones including notches formed through surface zones of said shutter element in correspondence with said spherical portion.

2. A valve according to claim 1 wherein said notches lie in a direction parallel to an axis of rotation of said shutter element.

3. A valve according to claim 2 wherein said notches extend substantially along a circumferential portion of said spherical portion of said shutter element.

4. A valve according to claim 1 wherein said notches in said shutter element have a base of curvilinear shape.

5. A valve according to claim 1 wherein said notches in said shutter element have a base of rectilinear shape.

6. A valve according to claim 1 wherein said notches in the shutter element have a base of peripheral circular shape.

7. A valve according to claim 1 wherein said notches in said shutter element extend peripherally along the entire spherical portion to provide a central portion of smaller dimension.

8. A valve according to claim 7 wherein said central portion of smaller dimension has an elliptical shape.

* * * * *